2,926,154

CATIONIC THERMOSETTING POLYAMIDE-EPICHLOROHYDRIN RESINS AND PROCESS OF MAKING SAME

Gerald I. Keim, West Grove, Pa., assignor to Hercules Powder Company, Wilmington, Del., a corporation of Delaware No Drawing. Application March 3, 1959
Serial No. 796,743

16 Claims. (Cl. 260—29.2)

This invention relates to novel water-soluble cationic thermosetting resins capable of imparting a high degree of wet strength to paper and to methods for preparing same.

At the present time, there is no commercial wet strength resin available which will function effectively at pH's much above 5.5. As a consequence, many grades of paper made on the alkaline side for various reasons such as strength, softness, use of alkaline fillers and so on, cannot be wet-strengthened. Moreover, the low pH required to effectively use the acid-curing wet-strength resins increases machine corrosion and raises maintenance costs.

An important object of the present invention is the provision of water-soluble cationic thermosetting resins which may be used to produce wet-strength paper under neutral or alkaline conditions, as well as under acid conditions, thereby making it possible to add wet-strength to any type of paper.

Another object of the invention is the provision of water-soluble cationic thermosetting resins which are highly substantive to paper fibers whereby relatively small amounts are required to produce satisfactory wet-strength in paper.

A further object of the invention is the provision of a novel, water-soluble cationic thermosetting resin of improved properties and a method of making same.

The above and other objects are accomplished by the provision of a novel cationic thermosetting resin which may be generally described as a polymeric reaction product of epichlorohydrin and a polyamide derived from a polyalkylene polyamine and certain dicarboxylic acids.

In the preparation of these products, the dicarboxylic acid is first reacted with the polyalkylene polyamine, preferably in aqueous solution, under conditions such as to produce a water-soluble long chain polyamide containing the recurring groups

where $n$ and $x$ are each 2 or more and R is the divalent organic radical of the dicarboxylic acid. This long chain polyamide is then reacted with epichlorohydrin to form the water-soluble cationic thermosetting resins of the invention.

The dicarboxylic acids contemplated for use in preparing the resins of the invention are the saturated aliphatic dicarboxylic acids preferably containing from 3 to 8 carbon atoms, such as malonic, succinic, glutaric, adipic, and so on, together with diglycolic acid. Of these, diglycolic acid and the saturated aliphatic dicarboxylic acids having from 4 to 6 carbon atoms in the molecule, namely, succinic, glutaric and adipic are most preferred. Blends of two or more of these dicarboxylic acids may also be used, as well as blends of one or more of these with higher saturated aliphatic dicarboxylic acids such as azelaic and sebacic, as long as the resulting long chain polyamide is water-soluble or at least water-dispersible.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention are polyamines containing two primary amine groups and at least one secondary amine group in which the nitrogen atoms are linked together by groups of the formula —$C_nH_{2n}$— where $n$ is a small integer greater than unity and the number of such groups in the molecule ranges from two up to about eight and preferably up to about four. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine or a heterocyclic diamine such as piperazine or the like for a portion of the polyalkylene polyamine. For this purpose up to about 60% of the polyalkylene polyamine may be replaced by a molecularly equivalent amount of the diamine. Usually a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes however temperatures between about 160° C. and 210° C. have been found satisfactory and are preferred. Where reduced pressures are employed somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid from about 0.9:1 to about 1.2:1 and preferably from about 0.92:1 to 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products do not produce efficient wet-strength resins when reacted with epichlorohydrin.

In converting the polyamide, formed as above described to a cationic thermosetting resin, it is reacted with epichlorohydrin at a temperature from about 45° C. to about 100° C. and preferably between about 45° C. and 70° C. until the viscosity of a 20% solids solution at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction it may be desirable, in some cases, to add alkali to combine with at least some of the acid formed.

When the desired viscosity is reached, sufficient water is then added to adjust the solids content of the resin solution to about 15% or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product.

In the polyamide-epichlorohydrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, it is contemplated utilizing from about 0.5 mole to about 1.8 moles of epichlorohydrin per mole polyamide secondary amine. It is preferred to utilize from about 0.9 mole to about 1.5 moles of epichlorohydrin per mole of polyamide secondary amine group.

The polyamide-epichlorohydrin resins, prepared as herein described, may be incorporated into pulp slurry at any point on the wet end of the paper machine. They may also be applied from a tub size or at a size press or from showers to the dried or partially dried sheet. For most purposes, adequate wet strength may be obtained by incorporating in the paper from about 0.25% to about 3% of the resin based on the dry weight of the pulp. However, in special cases up to 5% or more may be used.

The following examples will illustrate the invention.

EXAMPLE 1

Two hundred twenty-five grams (2.18 moles) of diethylenetriamine and 100 grams of water were placed in a 3-necked flask equipped with a mechanical stirrer, thermometer and condenser. To this was added 290 grams (2.0 moles) of adipic acid. After the acid had dissolved in the amine, the solution was heated to 185–200° C. and held there for 1½ hours. Then vacuum from a water pump was applied to the flask during the period required for the contents of the flask to cool to 140° C. following which 430 grams of $H_2O$ was added. The polyamide solution contained 52.3% solids and had an acid number of 2.1.

To 60 grams of this polyamide solution in a round-bottom flask was added 225 grams of $H_2O$. This solution was heated to 50° C. and 12.5 grams of epichlorohydrin was added dropwise over a period of 11 minutes. The contents of the flask was then heated to 60–70° C. until it had attained a Gardner viscosity of >E. Then 150 grams of $H_2O$ was added to the product, and it was cooled to 25° C. Eleven ml. of 10% HCl was then added to adjust the pH to 5.0. The product contained 9.0% solids and had a Gardner viscosity of C–D.

Tacoma-bleached kraft was beaten to a Schopper-Riegler freeness of 750 cc. in a Noble and Wood cycle beater. The pulp was then adjusted to pH 9.0 with 10% NaOH and 1.0%, based on the dry weight of pulp, of the polyamide-epichlorohydrin resin, prepared as described, was added. The pulp was sheeted on a Noble and Wood handsheet machine using a closed system in which the white water contained 100 p.p.m. sulfate ion and had been adjusted to pH 9.0 with 10% NaOH. A portion of the resulting handsheets were given an additional cure of 1 hour at 105° C. The sheets tested for wet strength were soaked for 2 hours in distilled water. Results are listed in Table 1.

EXAMPLE 2

A polyamide was prepared from 319 grams (2.18 moles) of triethylenetetramine and 290 grams (2.0 moles) of adipic acid according to the procedure described in Example 1. The polyamide solution contained 49.8% solids, and had a pH of 10.8 and an acid number of 3.2.

Sixty three grams of the polyamide solution was dissolved in 225 grams of $H_2O$. This solution was stirred mechanically and heated to 50° C. Twenty-five grams of epichlorohydrin was added dropwise over a period of three minutes. The solution was then heated to 60–70° C. until it reached a viscosity of E (Gardner). Then it was diluted with 225 grams of $H_2O$, cooled to 25° C. and adjusted to pH 5.0 with 11 ml. of 10% HCl. The product containing 8.4% solids and having a Gardner viscosity of <C, was evaluated in bleached kraft pulp according to the procedure presented in Example 1. Results are listed in Table 1.

EXAMPLE 3

A polyamide was prepared according to the procedure given in Example 1 using 225 grams (2.18 moles) of diethylenetriamine and 218 grams (1.5 moles) of adipic acid and 94 grams (0.5 mole) of azelaic acid. Fifty-seven and one half grams of the polyamide solution (55% solids) was dissolved in 115 grams of $H_2O$ and heated to 50° C. To this was added 15 grams of epichlorohydrin over a period of 6 minutes. This solution was then heated at 60–70° C. until the viscosity of the condensate reached >E (Gardner). Then 150 grams of $H_2O$ was added and the product was cooled to 25° C. It was adjusted to pH 5.0 by adding 10 ml. of 10% HCl. The finished resin had a viscosity of B (Gardner) and contained 9.5% solids. It was evaluated in paper according to the procedure outlined in Example 1. Results are listed in Table 1.

EXAMPLE 4

Sheets of paper were prepared and tested, as in Example 1, except that no resin was incorporated. The results are set forth in Table 1 below.

Table 1

| Example | Percent Resin Added Based on Dry Pulp | Basis Weight, lb./3,000 sq. ft. | Wet Tensile, lb./in. | Wet Tensile Cured, lb./in. |
|---|---|---|---|---|
| 1 | 1.0 | 40.6 | 6.5 | 8.5 |
| 2 | 1.0 | 39.2 | 5.9 | 8.6 |
| 3 | 1.0 | 40.8 | 7.4 | 8.7 |
| 4 | 0.0 | 40.5 | 0.2 | 1.1 |

EXAMPLE 5

To a solution of 20.6 g. (0.2 mole) of diethylenetriamine in 10 ml. of water in a small resin kettle, fitted with thermometer, stirrer, distilling head and nitrogen inlet tube, was added in six approximately equal portions 30.4 g. (0.2 mole) of recrystallized diglycolic acid. After the sixth acid addition the temperature, which had increased from about 50° to 95° C., was raised slowly to 148° C. by means of a Wood's Metal bath held at 175° C. The reaction mixture was held at a temperature of 138° to 148° C. for 2½ hours under partial reflux, during which the theoretical amount of water was collected. The product was then diluted with 45 ml. of hot water and cooled. It contained 48.7% total solids and had an intrinsic viscosity of 0.111.

The above polyamide was converted to a useful wet-strength resin for paper in a manner similar to that of Example 1. It was evaluated in paper in comparison with a control resin prepared from epichlorohydrin and a polyamide obtained from adipic acid and diethylenetriamine, such evaluation being as described in Example 1 except that the pH of the papermaking system was 7.5. Results are listed in Table 2.

Table 2

| Resin | Percent Resin | Wet Tensile (lb./in. width) | | Basis Weight, lb./3,000 sq. ft. |
|---|---|---|---|---|
| | | Uncured | Cured | |
| Example 5 | 1.0 | 6.8 | 11.0 | 40 |
| Control | 1.0 | 7.2 | 11.4 | 40 |

EXAMPLE 6

One hundred and eighty-three g. (1.25 m.) of triethylenetetramine and 40 g. of $H_2O$ were placed in a three-necked flask equipped with condenser, electric stirrer, and thermometer. To this was added 118 g. (1 m.) of succinic acid. The charge was then heated to 185° C. until 72 g. of water had been distilled off. A vacuum of 25 mm. was then applied removing about 5 g. of additional water. The product was then cooled to 140° C. and 200 g. of hot (90° C.) water was added. The product contained 54.7% solids.

One hundred and fifty g. of the polyamide solution and 100 g. of water were heated to 55° C. and 81 g. of epichlorohydrin added dropwise in 24 minutes. Heating was continued at 60–70° C. After 15 minutes the viscosity of the resin was D (Gardner). Water (75 ml.) was added and heating was continued until a viscosity of F—G was reached. This required 1 hour. Again 75 ml. of water was added and the resin solution was heated at 60–70° C. until a viscosity of R was reached. Then 400 ml. of water was added. The product had a pH of 6.5 and 14.3% total solids. This product was an efficient wet-strength resin for paper.

The following additional example will further illustrate the invention where a portion of the polyalkylene polyamine utilized in preparing the resin is replaced by a diamine.

EXAMPLE 7

A polyamide was prepared from the following ingredients:

Diethylenetriamine _____ 204.4 grams (1.98 moles).
Ethylenediamine _____ 14.0 grams (0.24 mole).
Adipic acid _____ 290.0 grams (1.98 moles).
Water _____ 100.0 grams.

The procedure of Example 1 was followed with the following exceptions. (1) The reaction mixture was held between 180° C. and 195° C. for 45 minutes; (2) aspirator vacuum was used during this entire period; and (3) the mixture was cooled to 140° C. and diluted with 430 ml. of distilled water (80° C.). The polyamide solution contained 52.4% total solids and had an acid number of 3.4.

To 60.5 grams of this polyamide solution was added 225.0 grams of $H_2O$. This solution was heated to 50° C. and 11.25 grams of epichlorohydrin was added dropwise over a period of about 11 minutes. The solution was then heated to 70–80° C. and held at this temperature until it had attained a viscosity of E Gardner-Holdt. It was then diluted with 173 ml. of water and adjusted to pH 5.0 with dilute HCl. The product contained 8.9% solids and had a Gardner viscosity of B—C.

Tacoma bleached Kraft Waterleaf sheets were tubsized (30-second dip) in a 2.0% aqueous solution of the resin, prepared as above described, and adjusted to pH 9.0 with 10% sodium hydroxide. The sheets were squeezed (roll) and drum dried. Half were cured at 105° C. for one hour and the cured and uncured sheets then soaked in distilled water for 2 hours and tested for Mullen burst. The Mullen burst (pounds per square inch-average of five determinations) was 10.8 for the uncured sheets and 15.2 for the cured sheets as compared with a Mullen burst of less than 1 for sheets which had not been treated with the resin.

EXAMPLE 8

A polyamide was prepared from the following ingredients:

Tetraethylene pentamine ___ 415 grams (2.2 moles).
Adipic acid _____ 265 grams (1.81 moles).
Water.

The water and amine were mixed and heated to 120° C. and the acid added over a period of 25 minutes. The mixture was heated at 165–170° for 110 minutes, cooled to 140° C. and 500 grams of water added. The final product contained 56.5% solids.

To 55.7 grams of the above mixture was added 230 grams of water. This solution was heated to 50° C. and 40 grams of epichlorohydrin added dropwise over a period of 10 minutes. The solution was then heated at 60–66° C. for 45 minutes. At the end of the heating period the viscosity was E on the Gardner-Holdt scale. Two hundred thirty grams of water was added and the resin was cooled to 25° C. The pH of the product was adjusted to 5.0 with 17 ml. of 4% hydrochloric acid. The total solids were 10.1%.

Bleached kraft handsheets (40 lbs. basis weight) were tubsized in a 2% solution of the above resin solution adjusted to pH 9.0 with 10% sodium hydroxide. The handsheets were then put through rubber squeeze rolls and dried on a drum drier to 5% moisture content. Half of the sheets were given an extra cure of 1 hour at 105° C. and the cured and uncured sheets then soaked in distilled water for 2 hours and tested for Mullen burst. The Mullen burst (pounds per square inch-average of five determinations) was 10.0 for the uncured sheets and 17.5 for the cured sheets. By comparison, handsheets which had been tubsized in a 2% solution of a commercial cationic amine modified urea-formaldehyde wet strength resin at pH 4.5 gave Mullen bursts of 7.0 lbs./sq. in. for the uncured sheets and 17.5 lbs./sq. in. for the cured sheets.

It will thus be seen that the present invention provides a novel water-soluble cationic thermosetting resin which is highly effective as a wet-strength resin for paper. These resins, moreover, may be incorporated in paper under acid, neutral or alkaline conditions, i.e., at pH's from about 4.0 to 10.0, thus making it possible to wet-strengthen any type of paper. However, optimum results, in terms of wet strength and freedom from corrosion of equipment, are obtained within the pH range of 6.0 to 9.0 and, hence, this range is preferred.

While the novel resins of the invention have been specifically described and exemplified in connection with their use as wet-strength resins for paper, they are also useful for various other purposes such as flocculating agents and as agents for the production of stable foams useful in flotation separations. While preferred embodiments of the invention have been described, the invention is not to be construed as limited thereby except as the same may be included in the following claims.

This application is a continuation-in-part of my co-pending application Serial No. 682,089 filed September 5, 1957.

What I claim and desire to protect by Letters Patent is:

1. A process of preparing an aqueous solution of a cationic thermosetting resin which comprises reacting a polyalkylene polyamine having two primary amine groups and at least one secondary amine group with a dicarboxylic acid selected from the group consisting of diglycolic acid and $C_3$ to $C_8$ saturated aliphatic dicarboxylic acids to form a water-soluble long chain polyamide containing secondary amine groups, the mole ratio of polyalkylene polyamine to dicarboxylic acid being from about 0.8 to 1 to about 1.4 to 1, and then reacting the polyamide in aqueous solution with epichlorohydrin in a mole ratio of epichlorohydrin to secondary amine groups of said polyamide of from about 0.5 to 1 to about 1.8 to 1 to form an aqueous solution of a water-soluble cationic thermosetting resin.

2. A process of preparing an aqueous solution of a cationic thermosetting resin which comprises reacting a polyalkylene polyamine having two primary amine groups and at least one secondary amine group with a dicarboxylic acid selected from the group consisting of diglycolic acid and $C_3$ to $C_8$ saturated aliphatic dicarboxylic acids in aqueous solution to form a long chain water-soluble polyamide containing secondary amine groups, the mole ratio of polyalkylene polyamine to dicarboxylic acid being from about 0.9 to 1 to about 1.2 to 1, and then reacting the polyamide solution with epichlorohydrin in a mole ratio of epichlorohydrin to secondary amine groups of said polyamide of from about 0.9 to 1 to about 1.5 to 1 to form an aqueous solution of a water-soluble cationic thermosetting resin.

3. A process according to claim 2 in which a portion of the polyalkylene polyamine is replaced by a diamine.

4. A process according to claim 2 in which a portion of the polyalkylene polyamine is replaced by an aliphatic diamine.

5. A process according to claim 2 in which the polyalkylene polyamine is a polyethylene polyamine having from 2 to 4 ethylene groups, two primary amine groups and from 1 to 3 secondary amine groups.

6. A process according to claim 5 in which the dicarboxylic acid comprises a $C_4$ to $C_6$ saturated aliphatic dicarboxylic acid.

7. A process according to claim 6 in which the dicarboxylic acid is adipic acid.

8. A process according to claim 6 in which the dicarboxylic acid is a blend of adipic acid and at least one other saturated aliphatic dicarboxylic acid.

9. A process according to claim 8 in which the dicarboxylic acid is a blend of adipic and azelaic acids.

10. A process according to claim 5 in which the dicarboxylic acid is diglycolic acid.

11. A process according to claim 6 in which the polyalkylene polyamine is diethylene triamine.

12. A process according to claim 6 in which the polyalkylene polyamine is triethylenetetramine.

13. A process according to claim 6 in which the polyalkylene polyamine is tetraethylenepentamine.

14. A process according to claim 7 in which the polyalkylene polyamine is diethylenetriamine.

15. A process according to claim 7 in which the polyalkylene polyamine is triethylenetetramine.

16. The product produced by the process of claim 1.

References Cited in the file of this patent

UNITED STATES PATENTS

| 2,468,086 | Latham et al. | Apr. 26, 1949 |
| 2,595,935 | Daniel et al. | May 6, 1952 |

FOREIGN PATENTS

| 884,560 | France | Apr. 27, 1943 |
| 711,404 | Great Britain | June 30, 1954 |

OTHER REFERENCES

Casey: Paper & Pulp, vol. 1 (1952), page 591, publ. by Interscience Publ., Inc., N.Y.